United States Patent [19]
Carson et al.

[11] Patent Number: 5,189,259
[45] Date of Patent: Feb. 23, 1993

[54] FACE PLATE HAVING PRESS-FIT ATTACHMENT TO ELECTRICAL SWITCHES, OUTLETS AND THE LIKE

[75] Inventors: Steven R. Carson, Upper Saddle River, N.J.; Jerry D. Gandre, Austin, Tex.

[73] Assignee: Lightolier, Inc., Secaucus, N.J.

[21] Appl. No.: 524,657

[22] Filed: May 17, 1990

[51] Int. Cl.$^5$ .............................................. H02G 3/14
[52] U.S. Cl. ......................................... 174/66; 174/57
[58] Field of Search ....................... 174/48, 53, 57, 66; 220/3.7, 3.92, 3.94, 241

[56] References Cited

U.S. PATENT DOCUMENTS

| | | | |
|---|---|---|---|
| 1,705,014 | 3/1929 | Hubbell | 174/66 |
| 1,840,582 | 1/1932 | Hubbell | |
| 2,740,873 | 4/1956 | Cronk | 174/66 |
| 3,197,549 | 7/1965 | Good | 174/66 |
| 3,720,783 | 3/1973 | Moll | 174/57 X |
| 3,987,928 | 10/1976 | Mori | 220/241 |
| 4,500,746 | 2/1985 | Meehan | 174/48 |
| 4,733,330 | 3/1988 | Tanaka et al. | 174/66 X |
| 4,800,239 | 1/1989 | Hill | 174/66 |
| 4,803,380 | 2/1989 | Jacoby, Jr. et al. | 307/157 |
| 4,835,343 | 5/1989 | Graef et al. | 174/66 |

*Primary Examiner*—Leo P. Picard
*Assistant Examiner*—David Tone
*Attorney, Agent, or Firm*—Dennis T. Griggs

[57] ABSTRACT

A two-piece face plate assembly includes a coupling plate which is mounted between the yoke strap of a wiring device and the mounting flange of a wall box. The coupling plate has a central opening for receiving the wiring device and has first and second index pins formed at spaced locations along the longitudinal axis of the coupling plate and in registration alignment with threaded mounting holes on the yoke strap. The coupling plate also has press-fit connectors positioned symmetrically about the central opening. The screwless face plate has a central opening for receiving the wiring device escutcheon and has a corresponding number of complementary press-fit connectors which are aligned for interlocking, press-fit engagement with the coupling plate connectors. The wiring device is mounted onto the wall box by screw fasteners extending through mounting slot openings formed through the yoke strap and in engagement with threaded mounting holes on the wall box. The index pins on the coupling plate project through the threaded retainer holes on the yoke strap, thereby maintaining horizontal and vertical alignment of the face plate with the wiring device. In a multiple wiring device installation, a segmented coupling plate is expandable to accommodate two or more wiring devices.

4 Claims, 4 Drawing Sheets

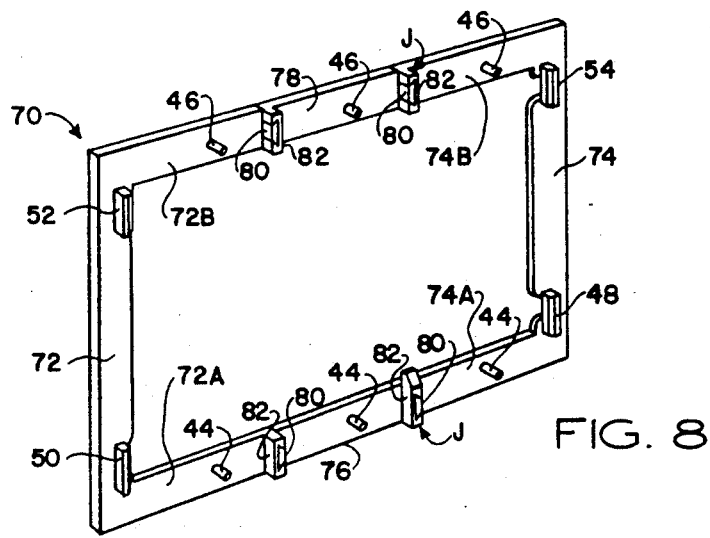
FIG. 8
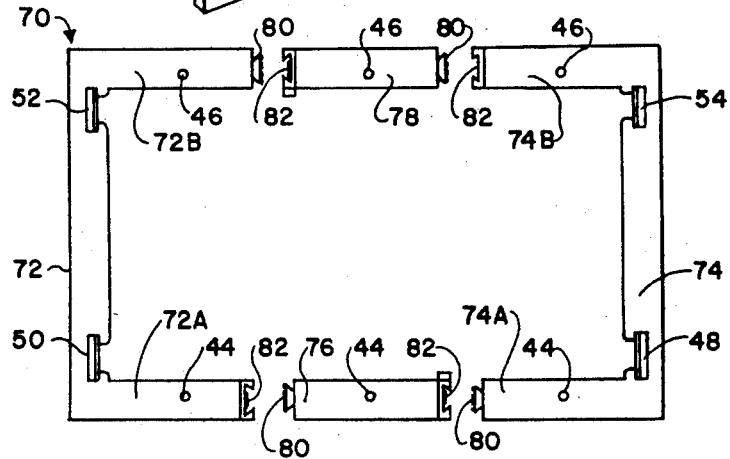
FIG. 9
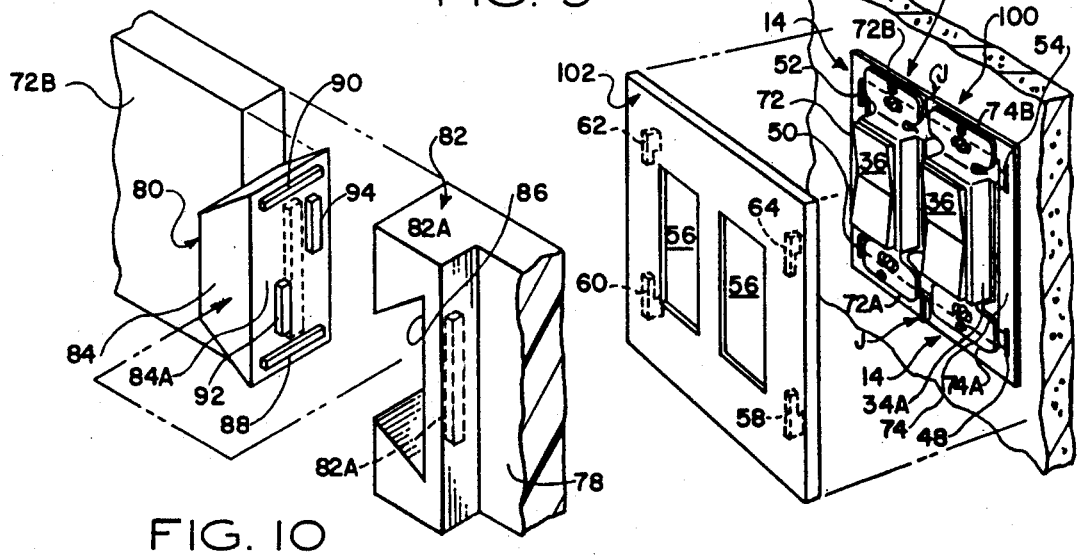
FIG. 10
FIG. 11

FACE PLATE HAVING PRESS-FIT ATTACHMENT TO ELECTRICAL SWITCHES, OUTLETS AND THE LIKE

FIELD OF INVENTION

This invention relates generally to wall-mounted enclosures for electrical wiring devices, and in particular to a face plate for completing the enclosure of a wall-mounted utility box of the type used to house and mount various electrical power control/distribution devices such as power switches, power outlets, dimmer controls and the like.

BACKGROUND OF THE INVENTION

Conventional wall box cover plates, referred to herein as face plates, are usually in the form of a flat plate having one or more openings providing access to a wiring device within a wall box. The purpose of the face plate is to provide a decorative cover for the wall box installation while preventing operator exposure to the interior of the wall box which contains electrical wiring. As used herein, "wiring device" refers generally to electrical power control/distribution devices, including but not limited to ON/OFF switches, outlets, dimmers, motor speed selector switches and the like, and to certain communications/data connectors such as telephone jacks, coaxial cable connectors, TV antenna connectors, and computer network cable connectors.

Wiring devices conforming to NEMA standards include a metal yoke or mounting strap with oversized mounting holes which permit horizontal position adjustment of the wiring device within a wall box. The yoke strap also includes one or more threaded mounting holes for attaching the face plate by screw fasteners onto the yoke strap, thereby completing the enclosure of the device and wiring terminations within the wall box.

The enclosed wiring device may have a switch actuator, control knob, power receptacle or the like which is supported on the mounting strap by an insulating escutcheon. The face plate access opening is closely conformed about the escutcheon to limit operator access to electrical terminals and wiring within the wall box.

Such wiring devices are conventionally mounted by screw fasteners onto wall boxes as described in NEMA Standards OS-1 and OS-2. Conventional face plates are also mounted by screw fasteners onto the wiring device. The standards for mounting the face plate are described in NEMA standards WD-1 and WD-6.

DESCRIPTION OF THE PRIOR ART

When screw fasteners are used to mount a conventional face plate onto the yoke strap of a wiring device, surface discontinuities are produced which detract from the aesthetic appearance of the installation. Some decorative face plates are formed of a colored polymeric material, for example white, ivory, black and brown to provide an approximate color match with the wall finish. Other decorative face plates may be covered with a section of wallpaper to provide an exact color and pattern match with decorative wall treatments. Such decorative installations require that the heads of the metal screw fasteners be color matched. The use of metal screw fasteners in connection with such decorative face plates has no always been satisfactory because the paint or plating on the head of the screw fastener tends to flake and wear away. Additionally, the metal screw fasteners tend to rust and become discolored.

Face plates constructed of polymeric materials are in widespread use. Another limitation on the use of screw fasteners for attaching such polymeric face plates is the risk of fracturing the face plate should the screw fastener be over-tightened.

OBJECTS OF THE INVENTION

The principal object of the present invention is to provide a face plate assembly in which the face plate can be securely mounted onto a wiring device without penetration of the face plate by screw fasteners.

Another object of the present invention is to provide a face plate assembly which permits the face plate to be coupled to the yoke strap of a NEMA standard wiring device by a press-fit snap-on connection.

A related object of the present invention is to provide a face plate assembly which is adapted for retrofit installation on a NEMA standard wall box in which an existing face plate and screw fasteners are removed and discarded, with the face plate assembly of the present invention being substituted in its plate.

Yet another object of the present invention is to provide a face plate assembly in a retrofit installation which can space and align multiple wiring devices in a multiple gang wall box assembly in which an external face plate is attached without the use of face plate screw fasteners.

A general object of the present invention is to provide an improved face plate assembly for an electrical wiring device, which not only covers the electrical wiring device, but also provides a decorative appearance.

Another object of this invention is to provide an improved face plate assembly of the character described, in which the face plate can be attached to a wall box installation without the use of external screw fasteners, and which can be removed without requiring special tools.

Still another object of the present invention is to provide a face plate cover assembly for a wiring device in a conventional wall box, in which the wiring device is secured by screw fasteners in the usual way, but in which the face plate is attached by a snap-fit connector which does not utilize screw fasteners, in which the entire wiring device, screw fasteners and wall box are hidden from view by the external face plate.

Another object of the present invention is to provide an improved face plate assembly which conforms to NEMA size specifications, as well as enclosure standards regarding flammability and mechanical strength, without limiting or otherwise interfering with aesthetic appearance of the installation.

Another object of the present invention is to provide an improved face plate assembly for use in combination with a wiring device of the type which is mounted by screw fasteners onto a wall box, in which the face plate can be installed without removing the wiring device from the wall box.

Yet another object of the present invention is to provide a face plate assembly which is adapted for use in combination with multiple wiring devices which are ganged together and installed in a multiple unit wall box.

Still another object of the present invention is to provide an improved face plate assembly of the character described, which is adapted for use in combination with wiring devices such as dimmer controls which include a heat sink plate for dissipating a heat load.

SUMMARY OF THE INVENTION

The foregoing objects are achieved by a two-piece face plate assembly for use in combination with a wiring device of the type having a yoke strap which is mountable within a wall box. The coupling plate has a central opening adapted for receiving the wiring device escutcheon and has first and second index pins formed at spaced locations along the longitudinal axis of the coupling plate beneath and below the central opening. The coupling plate also has press-fit connectors positioned about the central opening. The face plate has a central opening for receiving the wiring device escutcheon and has a corresponding number of press-fit connectors which are aligned for interlocking press-fit engagement with the press-fit connectors of the coupling plate. According to this arrangement, the wiring device is mountable onto a wall box by screw fasteners extending through the mounting slot openings formed through the yoke strap in threaded engagement with the threaded mounting holes on the wall box, with the coupling plate being confined between the yoke strap and the mounting box. The index pins of the coupling plate project into the threaded retainer holes of the yoke strap, thereby maintaining horizontal and vertical alignment of the face plate with the wiring device.

In an alternative embodiment which is adapted for multiple wiring device installations, a segmented coupling plate is expandable to accommodate two or more wiring devices. In this arrangement, the coupling plate is an assembly of left and right side frames, and one or more pairs of link segments. The segments have male and female connectors adapted for interlocking engagement with corresponding male and female connectors formed on the left and right side frames. The segmented coupling plate can be used in combination with a wiring device of the type having a heat sink plate for mounting a press-fit face plate in a dual gang installation, for example, a light dimmer control and a ceiling fan speed control.

The novel features of the invention are set forth with particularity in the claims. The invention will be best understood from the following description when read in conjunction with the accompanying drawings, wherein:

BRIEF DESCRIPTION OF THE DRAWINGS

FIG. 8 is a perspective view of an alternative embodiment of a coupling plate adapted for use in combination with a triple unit installation;

FIG. 9 is an exploded plan view of the triple unit coupling plate shown in FIG. 8;

FIG. 10 is a perspective view which illustrates the snap-fit connector members which are formed on the mating end portions of the coupling plate segments shown in FIG. 9;

FIG. 11 is a front perspective view of a dual switch installation with a dual face plate shown aligned for press-fit assembly onto a dual gang coupling plate;

DETAILED DESCRIPTION OF THE PREFERRED EMBODIMENTS

Figure 1:
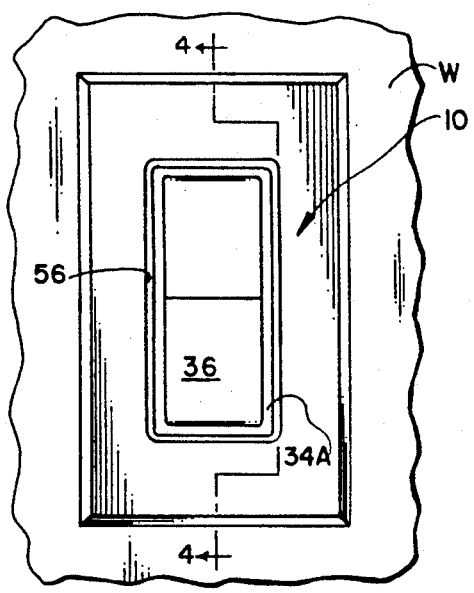
FIG. 1 is an elevation view of an ON/OFF switch installation wherein the escutcheon, yoke strap and wall box are covered by a screwless face plate assembly constructed according to the teachings of the present invention.
Figure 2:
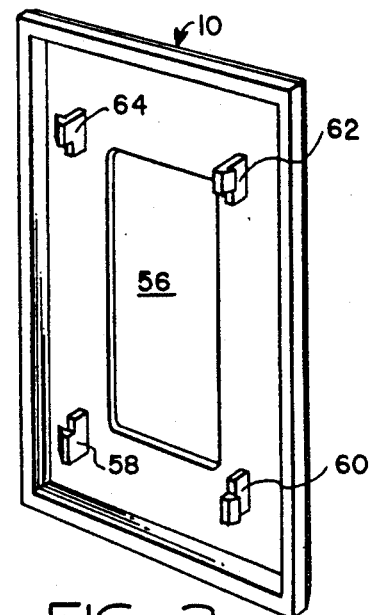
FIG. 2 is a rear perspective view of the face plate shown in FIG. 1.
Figure 3:
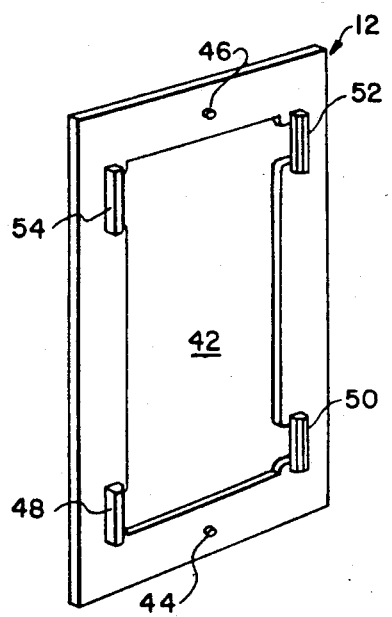
FIG. 3 is a front perspective view of a coupling plate which is used in combination with the face plate shown in FIG. 2.
Figure 4:
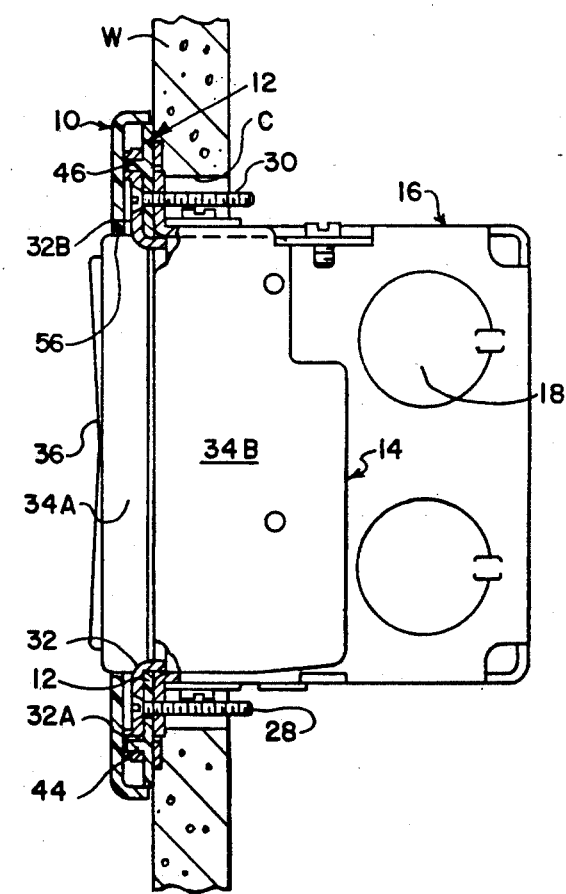
FIG. 4 is a sectional view of the switch assembly shown in FIG. 1 taken along the lines 4—4.

In the description which follows, like parts are marked throughout the specification and drawings with the same reference numerals, respectively. The drawings are not necessarily to scale and the proportions of certain parts have been exaggerated to better illustrate features of the invention.

Referring now to FIGS. 1-7, the face plate assembly of the present invention includes a face plate 10 and a coupling plate 12 which are adapted for use in combination with a wiring device, such as an ON/OFF switch 14, which is installed within a conventional wall box 16. The wall box 16 is nailed against an upright 2×4 wall stud, with the face of the wall box being substantially flush mounted on a wall W within a rectangular cutout opening C. The wall box 16 provides a stable, protective enclosure in which the ON/OFF switch 14 or other wiring device can be safely mounted. Knock-out tabs 18 are formed in the sidewalls of the wall box 16 through which electrical power distribution conductors are routed for interconnection with power terminals or wiring leads which form a part of the wiring device 14.

The wall box 16 includes mounting flanges 18, 20 in which threaded openings 22, 24 are formed, respectively. The mounting holes 22, 24 in the mounting flanges 18, 20 are standard 6-32 threaded mounting holes. The threaded mounting holes 22, 24 are spaced along standard 3¼ inch centers in alignment with the longitudinal axis R of the wall box 16. The wall box cavity 26 has a standard rectangular opening of about 1⅜ inches wide by about 2⅞ inches high. The ON/OFF switch 14 is attached to the mounting flanges 18, 20 of the wall box 16 by a pair of threaded screw fasteners 28, 30.

The ON/OFF switch 14 is mounted onto a metal yoke strap 32 and is insulated with respect thereto by a insulating switch body 34. The switch body 34 houses fixed and movable switch contacts, and supports a toggle actuator 36 for pivotal movement between ON and OFF positions.

The switch body 34 has an insulating escutcheon 34A which projects forward of the yoke strap 32 for presenting the toggle actuator 36 for operator access, and a main switch body portion 34B behind the yoke strap 32 which is received within the wall box cavity 26. The yoke strap 32 has mounting flanges 32A, 32B which project below and above the wall box opening. A pair of slot openings 38, 40 are formed on the mounting flanges 32A, 32B in alignment with the longitudinal axis D of the switch 14. The slot openings 38, 40 are elongated laterally and are sized to permit unrestricted passage of the screw fasteners 28, 30. According to this arrangement, the ON/OFF switch 14 is mountable onto the wall box 16, and the horizontal position of the ON/OFF switch 14 relative to the wall box 16 is adjustable so that the switch can be centered within the wall cutout opening C. The center-to-center spacing of the slot openings 38, 40 is the same as the center-to-center spacing of the threaded screw holes 22, 24.

The coupling plate 12 has a rectangular opening 42 through which the switch body 34B and the screw fasteners 28, 30 are extended in coupling engagement with the mounting flanges 18, 20 of the wall box 16. Index pins 44, 46 are mounted onto the coupling plate 12 in alignment with the central longitudinal axis Z of the coupling plate 12. Also formed on the coupling plate 12 are press-fit connectors 48, 50, 52 and 54. The press-fit connectors 48, 50, 52 and 54 each have an interlock pocket in the form of an elongated slot S which is partially closed by a retainer flange F.

Figure 7:
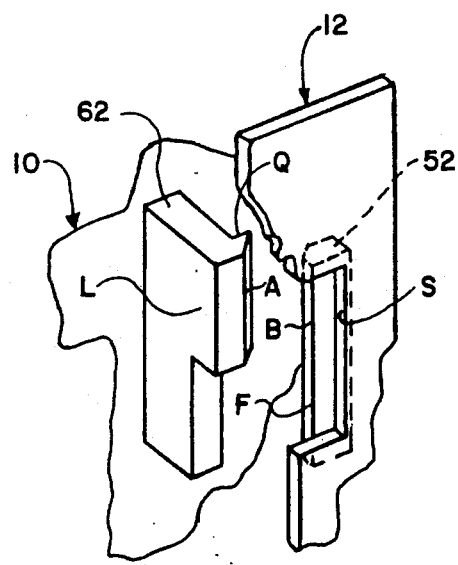
FIG. 7 is a perspective view, partially broken away, which illustrates the press-fit connectors carried by the face plate and coupling plate shown in FIG. 2 and FIG. 3.

Referring now to FIG. 7, the slot S in each connector pocket is adapted for interlocking engagement with complementary press-fit connector studs 58, 60, 62 and 64, respectively, which are mounted on the reverse side of the face plate 10. Each connector stud has a latch post L which is adapted for insertion into the connector pocket S. The connector studs 58, 60, 62 and 64, and the latch post L, are adapted to produce an interference engagement upon insertion of the latch post L into the pocket S. To facilitate insertion of the latch post L, the latch post L has a beveled face A and the retainer flange F has a complementary beveled face B.

As the latch post L is inserted into the slot S, the beveled faces A, B slip relative to each other. At the same time, the latch post L deflects laterally outwardly, and the retainer flange F deflects inwardly to permit the latch post L to be fully inserted into the pocket S. The latch post L has a transverse shoulder Q which retracts into engagement with the underside of the retainer flange F, thereby retaining the latch post L as the latch post L is fully inserted and the beveled face A clears the beveled face B, securely within the pocket S.

The face plate 10 has a rectangular opening 56 through which the escutcheon 34A projects. The press-fit connector studs 58, 60, 62 and 64 are positioned symmetrically about the longitudinal axis P of the face plate 10 and are aligned for interlocking press-fit engagement within the elongated slot S in the press-fit connectors 48, 50, 52 and 54 which are mounted onto the coupling plate 12. The face plate opening 56 is centered about the axis P and is sized for a close, conforming fit about the escutcheon 34A, thereby concealing the yoke strap, wiring device, screw fasteners and wiring box.

Figure 5:
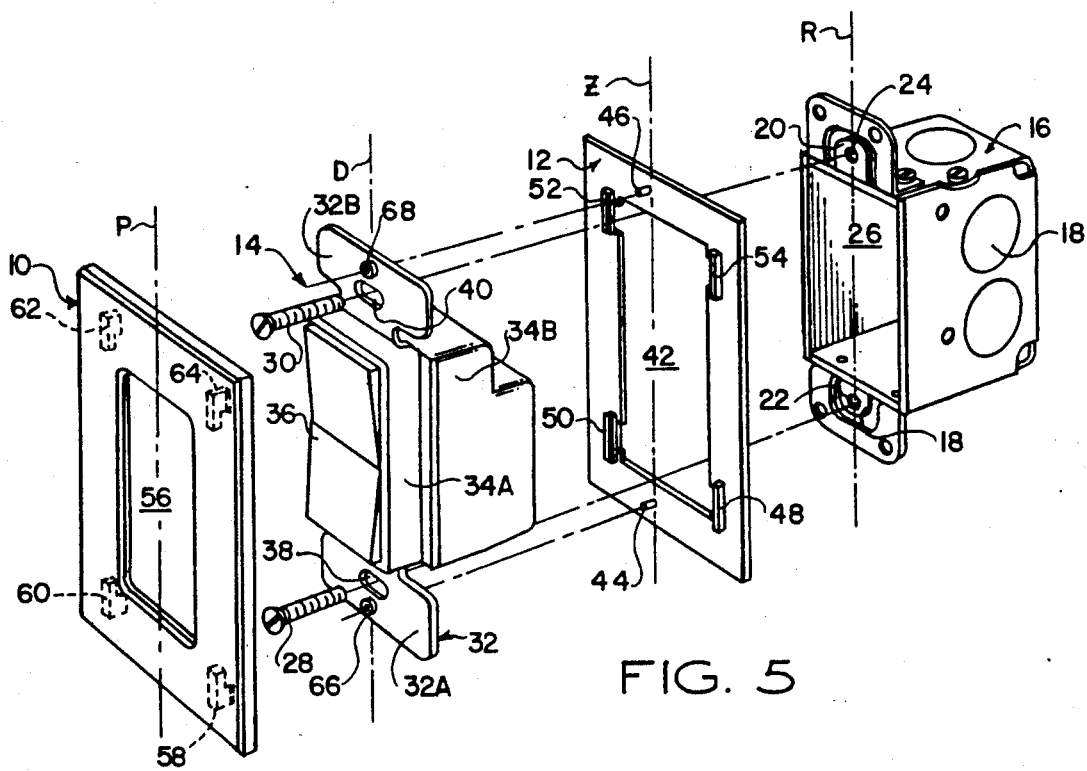
FIG. 5 is an exploded perspective view of the switch assembly shown in FIG. 1.
Figure 6:
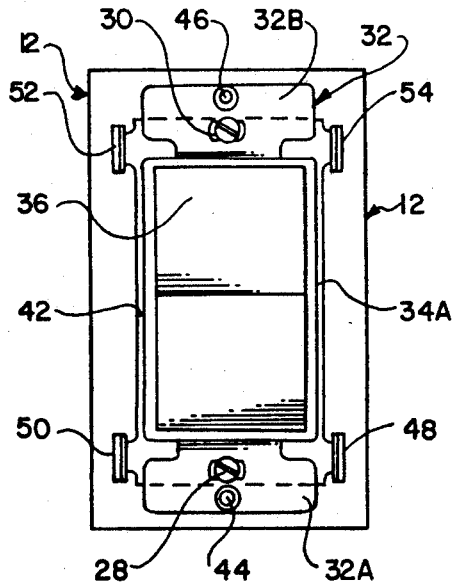
FIG. 6 is a front elevational view of the switch assembly shown in FIG. 1 with the face plate removed.

When the coupling plate 12 is assembled as shown in FIG. 5, it provides press-fit attachment of the face plate 10 without using screw fasteners. The coupling plate 12 provides a stable base and longitudinal alignment for the face plate 10. The stable foundation is achieved by capturing the coupling plate 12 between the mounting strap 32 and the wall box mounting flanges 18, 20. The rectangular opening 42 within the coupling plate 12 is oversized with respect to the switch body 34B, thereby providing clearance for passage of the screw fasteners 28, 30 for engagement with the threaded mounting holes 22, 24 of the wall box mounting flanges 18, 20. As the screw fasteners 28, 30 are tightened, the yoke strap mounting flanges 32A, 32B tightly compress the coupling plate 12 against the wall box mounting flanges 18, 20.

According to one aspect of the invention, longitudinal alignment of the coupling plate 12 relative to the ON/OFF switch 14 is provided by the index pins 44, 46 which are mounted in registration with threaded mounting holes 66, 68 which are on standard centers and are in alignment with the longitudinal axis D. The threaded mounting holes 66, 68 are sized for threaded engagement with 6-32 screw fasteners for attaching a conventional face plate. In this embodiment, however, the threaded mounting holes 66, 68 are used to receive the index pins 44, 46. This aligns the coupling plate 12 with the ON/OFF switch 14 and insures that the face plate 10 is aligned with the ON/OFF switch 14 when it is installed in press-fit engagement with the pocket connectors of the coupling plate 12.

According to an important feature of the invention, the coupling plate 12 can be installed on a retrofit basis without removing the switch 14 out of the wall box 16. The width of the central rectangular opening 42 in the coupling plate 12 is oversized with respect to the switch 14, so that the coupling plate 12 can be slipped over the bottom mounting flange 32A or the top mounting flange 32B of the yoke strap 32. To carry out the retrofit installation, it is only necessary to loosen the screw fasteners 28, 30 to provide a slight clearance between the yoke strap 32 and the face of the wall box 16, and then insert the coupling plate 12 between the yoke strap mounting flanges 32A, 32B and the face of the wall box 16.

The screw fasteners 28, 30 should be loosened so that the switch 14 can be pulled away from the wall box by about 5/32 of an inch, which provides sufficient clearance for the coupling plate 12 and the index pins 44, 46. After the coupling 12 has been slipped behind the ON/OFF switch 14, the index pins 44, 46 are inserted into the threaded mounting holes 66, 68. The horizontal position of the ON/OFF switch 14 is adjusted, as necessary, to center the switch assembly within the wall cutout opening C. After that has been accomplished, the screw fasteners 28, 30 are tightened, thereby rigidly locking the coupling plate 12 against the wall box 16. The old face plate and retainer screws are discarded, and the new face plate 10 is assembled onto the coupling plate 12 by pressing the connector studs 58, 60, 62 and 64 into interlocking engagement with the press-fit connector pockets 48, 50, 52 and 54.

Referring now to FIG. 8, FIG. 9 and FIG. 10, a segmented coupling plate 70 is adapted for multiple wiring device installations. In this alternative embodiment, the segmented coupling plate 70 is expandable to accommodate two or more wiring devices in a multiple gang installation. The segmented coupling plate 70 is an assembly of identical left and right side frames 72, 74 and one or more pairs of identical link segments 76, 78. Each side frame 72, 74 carries press-fit connectors 50, 52 and 48, 54, respectively. The side frames 72, 74 are identical in all respects, with the right side frame 74 being rotated during assembly by 180 degrees with respect to the left frame member 72.

The left and right side frames 72, 74 have side arms 72A, 72B and 74A, 74B which project at right angles with respect to the side frames 72, 74, respectively. The index pins 44, 46 are mounted onto the side arms 72A, 72B and also on the side arms 74A, 74B. The side arms 72A, 72B have male and female connectors 80, 82 which are adapted for mutually coacting, interlocking engagement. The link segments 76, 78 also have male and female connectors 80, 82 formed at opposite ends. The link segments 76, 78 are identical, and have index pins 44, 46, respectively. However, the link segments are rotated by 180 degrees with respect to each other to provide linking interconnection between the left side frame 72 and the right side frame 74 in a three gang installation.

The left and right side frames can be assembled directly to each other to accommodate a two gang installation, as shown in FIG. 11. In the two gang installation, the link segments 76, 78 ar not required. The left side frame 72 is assembled directly onto the right side frame 74 by the interlocking engagement of the male and female connectors 80, 82. When three or more wiring devices are to be installed, the left and right side frames 72, 74 are coupled together by one or more pairs of the link segments 76, 78.

Referring now to FIG. 10, the mutually coacting, interlocking engagement is provided by the male and female fasteners 80, 82 which are adapted for press-fit dovetail engagement. In this arrangement, the male fastener is a dovetail tenon 84 in the form of an inverted wedge. The female fastener 82 has a complementary dovetail mortise 86 which is adapted for dovetail engagement with the tenon 84, thereby producing a dovetail union J.

The dovetail union J of the tenon 84 and mortise 86 is reinforced and stabilized by horizontal spacer bars 88, 90 and vertical spacer bars 92, 94 which are formed on and project laterally from the coupling face 84A of the tenon 84. The horizontal spacer bars 88, 90 are disposed in parallel with each other, and are spaced apart vertically to receive and confine an index bar 82A formed on the female connector 82 within the mortise cavity 86. The vertical space bars 92, 94 are laterally spaced on the tenon coupling face 84A for confining the lateral position of the index bar 82A when the tenon 84 is inserted into the mortise 86.

When the tenon 84 is pressed into the cavity 86, the passage of the tenon 84 is initially restricted by engagement of the lateral space bar 94 against the index bar 82A. The interference engagement is overcome by deflection of the tenon within the mortise 86, thereby permitting the index bar 82A to slip by the lateral space bar 94. In the interlocked position indicated by the phantom line superimposed on the tenon 84 of FIG. 10, the index bar 82A is confined laterally by the lateral spacer bars 92, 94 and vertically by the vertical spacer bars 88, 90.

The dovetail union opposes longitudinal separation of the sidearm 72B relative to the link segment 78. Lateral movement of the tenon 84 relative to the mortise 86 is opposed by the interlocking engagement of the index bar 82A against the lateral spacer bars 92, 94. The dovetail union J can be released by applying lateral pressure against the male connector 80 relative to the female connector 82 to produce sufficient deflection to permit the index bar 82A to slip over the lateral spacer bars. The dovetail union J is a strong, stable interconnection which can be quickly assembled to provide a segmented coupling plate for accommodating two or more wiring devices.

A two gang switch assembly 100 is illustrated in FIG. 11 in which a two gang coupling plate 70 is mounted onto a two gang wall box. A two gang, screwless face plate 102 is positioned for press-fit engagement with the female connectors 48, 50, 52 and 54. The segmented coupling plate 70 is produced by the direct interconnection of the left side frame 72 onto the right side frame 74 without using the link segments 76, 78. After the connector studs 58, 60, 62, 64 have been inserted into the pockets S of the press fit female connectors 48, 50, 52 and 54, respectively, the toggle switch actuators 36 and escutcheons 34A project through the central rectangular openings 56 formed in the face plate 102. The toggle actuators 36 are automatically aligned with the rectangular openings 56 by the index pins 44, 46 which project through the threaded mounting holes in the yoke straps of each switch 14. The underlying switch components, including the yoke strap, screw fasteners, mounting box and wiring are completely concealed by the decorative wall plate 102.

The decorative face plate 102 can be assembled onto and removed from the dual gang switch assembly without the use of tools, since the press-fit connectors are engagable and can be interlocked simply by pressing the face plate against the wall box assembly, and can be removed manually by pulling it away. The attachment of the face plate 102 against the dual gang wall box is secured by interlocking engagement of the male and female connectors, and can be released only by overcoming the detented, interference union of the male connector latch L within the female connector pocket S.

Figure 12:
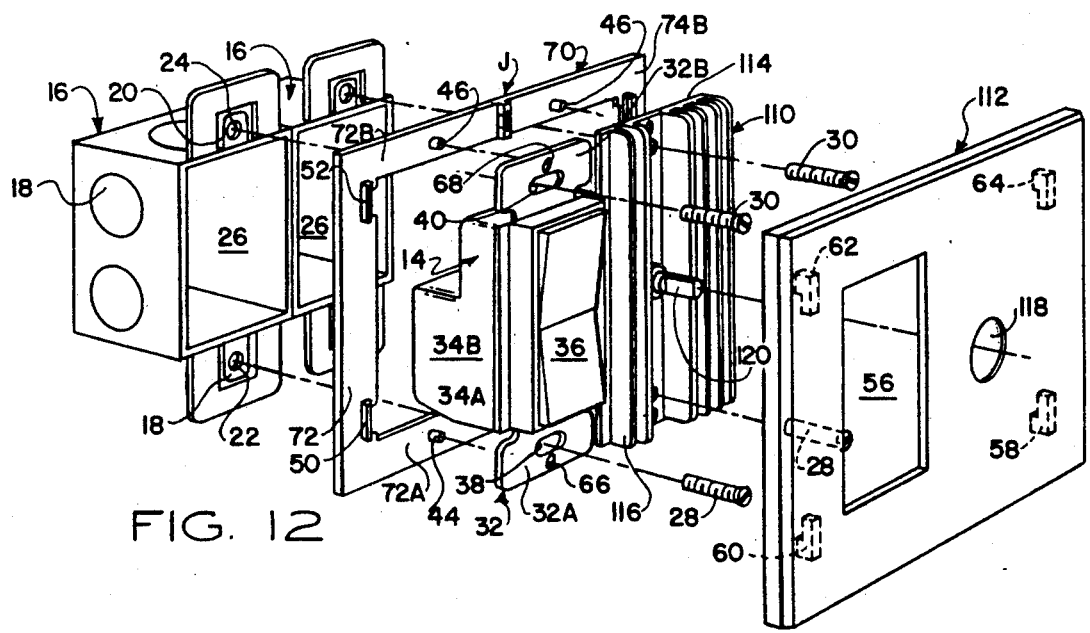
FIG. 12 is an exploded perspective view of a dual gang dimmer and ON/OFF fan control installation.
Figure 13:
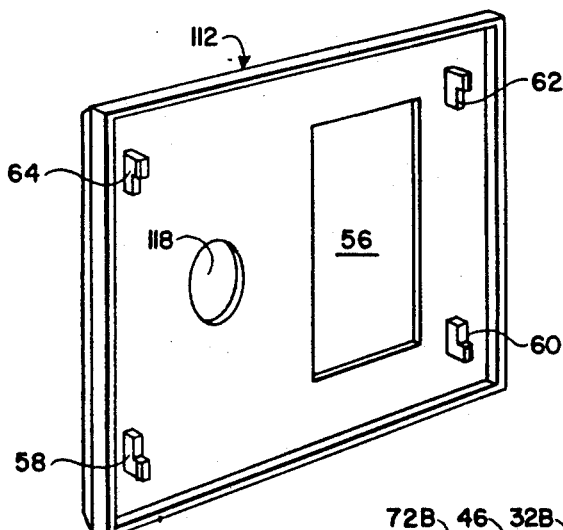
FIG. 13 is a rear perspective view of the dual gang face plate shown in FIG. 12.
Figure 14:
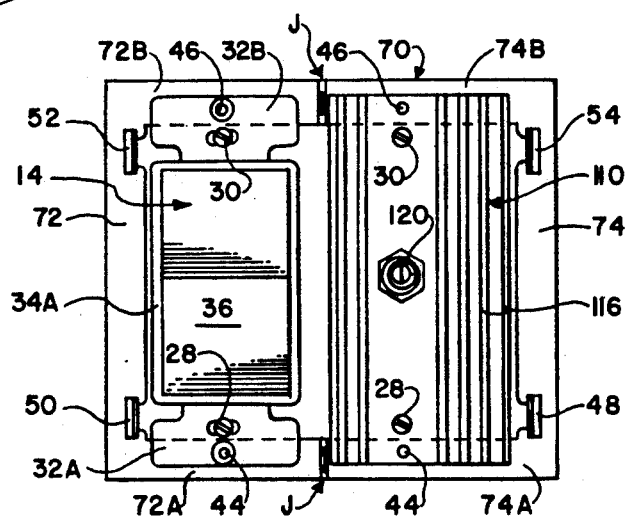
FIG. 14 is a front elevational view of the dual gang assembly shown in FIG. 12.

Referring now to FIG. 12, FIG. 13 and FIG. 14, the two gang expandable coupling plate 70 is assembled onto a two gang wall box installation in which a solid state light dimmer unit 110 is installed side by side with an ON/OFF fan switch 14. In this assembly, a screwless decorator face plate 112 is attachable onto the expandable coupling plate 70 by the interlocking engagement of male connectors 58, 60, 62 and 64 carried on the face plate with female connectors 48, 50, 52 and 54 carried on the coupling plate 70. The solid state dimmer unit 110 has an oversized heat sink 114 for radiating heat dissipated by the dimmer circuit.

In some dimmer units, it is necessary to remove one or more of the radiator fins so that the physical size of the dimmer unit will conform with NEMA standard width dimensions. Some dimmer units have heat sink plates which have been prescored to permit one or more of the heat sink radiator fins 116 to be broken away and removed, thereby providing the desired lateral clearance which permits another wiring device such as the ON/OFF fan switch 14 to be mounted on a standard NEMA center spacing relative to the dimmer 110, with the dual gang assembly being covered by a decorative, screwless face plate 112. The decorative face plate 112 has a circular cutout opening 118 through which the dimmer control shaft 120 projects. The segmented coupling plate 70 can be used in combination with diverse wiring devices in multiple gang installations.

It will be appreciated that the foregoing two-piece face plate assembly can be utilized to mount a decorative face plate onto a wiring device wall installation without the use of screw fasteners. Instead, the decorative face plate is attached to the yoke strap of a NEMA standard wiring device by a coupling plate which is confined between mounting flanges on the wiring device and mounting flanges on the wall box. The face plate assembly is adapted for retrofit installation, with the screwless face plate being attachable to the wall box installation without removing the wiring device from the wall box. The wiring device retaining screws are used to secure the wiring device within the wall box, with the coupling plate being compressed between the wiring device and the wall box.

The coupling plate and its complementary press-fit connectors are automatically aligned with the wiring device by index pins which are inserted into the face plate mounting holes. Consequently, the body of the wiring device, its retaining screw fasteners and the wall box are hidden from view by the external face plate, with only the escutcheon being exposed. Thus the decorative wall plate can conform with enclosure standards regarding flammability and mechanical strength, without limiting or otherwise interfering with the aesthetic appearance of the installation. Moreover, the coupling plate can be expanded for use in combination with multiple wiring devices which are ganged together and installed in a multiple unit wall box, with the wiring devices, coupling plate and electrical wiring being enclosed by a single face plate which is attache to the assembly press-fit connectors and is not penetrated by external screw fasteners.

While certain preferred and alternative embodiments of the invention have been set forth for purposes of disclosure, modifications to the disclosed embodiments as well as other embodiments thereof may occur to those skilled in the art. Accordingly, the appended claims are intended to cover all embodiments of the invention and modifications thereof which do not depart from the spirit and scope of the invention.

What is claimed is:

1. A segmented coupling plate adapted for multiple wiring device installations comprising, in combination:

a left side frame having a first central portion and first and second sidearms which project at right angles with respect to said first central portion, said first and second sidearms each having first and second index pins projecting transversely with respect thereto, respectively;

a right side frame having a second central portion and third and fourth sidearms projecting at right angles with respect to said second central portion, said third and fourth sidearms each having third and fourth index pins projecting transversely with respect thereto, respectively;

said left side frame having first and second press-fit connectors mounted on said left side frame at laterally spaced locations relative to said first and second index pins;

said right side frame having third and fourth press-fit connectors mounted on said right side frame at laterally spaced locations relative to said third and fourth index pins;

the first and second sidearms of said left side frame having mutually coacting, interlocking male and female connectors, respectively;

the third and fourth sidearms of said right side frame having complementary male and female connectors, respectively; and, wherein the male and female connectors on the first and second sidearms are adapted for mutually coacting, interlocking engagement with the male and female connectors on the third and fourth sidearms, respectively, for assembly of the right side frame onto the left side frame.

2. A segmented coupling plate as defined in claim 1, including first and second link segments interposed between the sidearms of the left and right side frames, each link segment having complementary male and female connectors formed at opposite ends respectively, said male and female connectors being adapted for mutually coacting, interlocking engagement with the male and female connectors on the sidearms of said left and right side frames.

3. A segmented coupling plate as defined in claim 1, wherein each male connector comprises a dovetail tenon in the form of an inverted wedge, and each female connector comprises a complementary dovetail mortise.

4. A segmented coupling plate as defined in claim 3, wherein said tenon includes first and second horizontal spacer bars and first and second vertical spacer bars which are formed on and project outwardly from the coupling face of said tenon;

said female connector having an index bar disposed within the mortise, said index bar being insertable into the space between the vertical spacer bars and the horizontal spacer bars in response to lateral pressure applied against the male connector relative to the female connector as the tenon is inserted into the mortise.

* * * * *

UNITED STATES PATENT AND TRADEMARK OFFICE
CERTIFICATE OF CORRECTION

PATENT NO. : 5,189,259

DATED : February 23, 1993

INVENTOR(S) : Steven R. Carson and Jerry D. Gandre

It is certified that error appears in the above-identified patent and that said Letters Patent is hereby corrected as shown below:

Column 1, line 67, "no" should be -- not --

Column 7, line 14, "ar" should be -- are --

Column 9, line 22, "attache" should be -- attached --

Signed and Sealed this

Ninth Day of November, 1993

*Attest:*

BRUCE LEHMAN

*Attesting Officer*   *Commissioner of Patents and Trademarks*